US006664971B1

(12) United States Patent
Mukherjee et al.

(10) Patent No.: US 6,664,971 B1
(45) Date of Patent: Dec. 16, 2003

(54) METHOD, SYSTEM, AND COMPUTER PROGRAM PRODUCT FOR ANISOTROPIC FILTERING AND APPLICATIONS THEREOF

(75) Inventors: Shrijeet S. Mukherjee, Mountain View, CA (US); Angus M. Dorbie, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 436 days.

(21) Appl. No.: 09/684,812

(22) Filed: Oct. 10, 2000

Related U.S. Application Data
(60) Provisional application No. 60/227,940, filed on Aug. 25, 2000.

(51) Int. Cl.[7] .................................................. G09G 5/00
(52) U.S. Cl. ....................... 345/582; 345/588; 345/583; 345/584; 345/585; 345/586; 345/587
(58) Field of Search ................................. 345/582, 583, 345/584, 585, 586, 587, 588

(56) References Cited

U.S. PATENT DOCUMENTS

| | | | | |
|---|---|---|---|---|
| 6,081,273 A | * | 6/2000 | Weng et al. ................. | 345/420 |
| 6,384,835 B1 | * | 5/2002 | Reiter et al. ................. | 345/582 |
| 6,392,655 B1 | * | 5/2002 | Migdal et al. ............... | 345/582 |

OTHER PUBLICATIONS

Statement of facts Concerning Certain Marketing Activities by Silicon Graphics, Inc.
Hüttner et al., "Fast Footprint MIPmapping," *1999 Eurographics/SIGGRAPH Workshop on Graphics Hardware*, ACM, Inc., Los Angeles, California, Aug. 1999, pp. 35–43.
Schrilling et al., "Texram: A Smart Memory for Texturing," *IEEE Computer Graphics and Applications*, vol. 16, No. 3, IEEE, May 1996, pp. 32–41.

* cited by examiner

*Primary Examiner*—Matthew C. Bella
*Assistant Examiner*—Mancher Rahmjoo
(74) *Attorney, Agent, or Firm*—Lee & Hayes, PLLC

(57) ABSTRACT

A first copy of an object is rendered using a texture sample selected from a texture image. This texture sample is selected from the texture image according to a first set of texture coordinates. The rendered object is stored in a frame buffer. Next, a second copy of the object is rendered using a second texture sample selected from the texture image. The second texture sample is selected from the texture image according to a second set of texture coordinates calculated in accordance with the first set of texture coordinates and one or more Jitter factors. The second set of calculated texture coordinates is displaced from the first set of texture coordinates along an axis of anisotropy. This second rendered copy of the object is then blended with the first rendered copy of the object to produce an object with anisotropic filtering. In embodiments of the invention, more than two copies of the object are rendered and blended together to form an object with anisotropic filtering.

20 Claims, 11 Drawing Sheets

METHOD, SYSTEM, AND COMPUTER PROGRAM PRODUCT FOR ANISOTROPIC FILTERING AND APPLICATIONS THEREOF

CROSS REFERENCE TO RELATED APPLICATION

The present application claims the benefit of U.S. Provisional Application No. 60/227,940, filed Aug. 25, 2000, which is herein incorporated by reference in its entirety. This application contains subject matter related to commonly owned, copending U.S. patent application Ser. No. 09/684,810, filed Oct. 10, 2000, which is herein incorporated by reference in its entirety.

BACKGROUND OF THE INVENTION

1. Field of the Invention

The present invention relates to computer graphics. More particularly, the present invention relates to anisotropic filtering techniques and applications thereof.

2. Related Art

As would be known to a person skilled in the relevant computer graphics art, it is difficult to model intricate surface details of objects using geometric primitives or polygons (e.g., triangles). This difficulty however can be overcome in many instances by a process known as texture mapping.

The process of texture mapping involves mapping or applying a texture image to a surface of a computer-generated object or graphical model as the object is rendered. More particularly, the process of texture mapping involves sampling intensity data (i.e., texels) of a texture image during the rendering of a computer scene. The sampled texels of the texture image are used to generate pixel intensity values for the pixels of the final computer scene.

While the process of texture mapping has many benefits, it also has some undesirable effects. For example, one undesirable effect produced by the process of texture mapping is a form of image distortion known in the relevant art as aliasing. Aliasing is caused, for example, by the use of rendering techniques that assign an intensity value of a primitive or texture sample being rendered to a pixel of the final computer scene, regardless of whether the primitive or texture sample covers all or only a portion of the pixel of the final scene. Aliasing results in computer scenes that are blurry or that have jagged edges.

In real time graphics systems, aliasing is a particularly significant problem. Because real time graphics systems must compute all the pixels of a computer scene in a very short, fixed duration of time, real time graphics systems make approximations in both the size and shape of the area of a texture image that should be sampled during rendering. The area of the texture image sampled during rendering (commonly referred to in the relevant computer graphics art as a filter footprint) defines which texels of the texture image are used to compute the intensity values of the pixels of the computer scene. These approximations add distortion to the final computer scene.

In order to reduce the amount of aliasing that results from the process of texture mapping, some computers are equipped with specially designed graphics hardware that allows pre-filtered texture images (called MIPMAPs) to be stored in a texture memory and accessed during the rendering of a computer scene. Using pre-filtered texture images to render a computer scene helps to eliminate some of the image artifacts caused by texture mapping, and it shortens the amount of time needed to render a computer scene. Some of the known available features of specially designed graphics hardware include the ability to perform bilinear and/or trilinear filtering of texture images during the rendering of a computer scene. As would be known to a person skilled in the relevant art, however, available graphics hardware, including available specially designed graphics hardware, has many limitations. For example, most available graphics hardware cannot anisotropicly filter a texture image during the rendering of a computer scene, and specially designed graphics hardware that can perform anisotropic filtering is expensive and limited in its ability to anisotropicly filter a texture image.

What is needed are new techniques for anisotropicly filtering texture images that overcome the deficiencies and limitations discussed above.

SUMMARY OF THE INVENTION

The present invention provides anisotropic filtering techniques and applications thereof. In an embodiment, an object is rendered with anisotropic filtering by rendering a first copy of the object using a texture sample selected from a texture image. This texture sample is selected from the texture image according to a first set of texture coordinates. The rendered object is stored in a frame buffer. Next, a second copy of the object is rendered using a second texture sample selected from the texture image. The second texture sample is selected from the texture image according to a second set of texture coordinates calculated in accordance with the first set of texture coordinates and one or more Jitter factors. The second set of calculated texture coordinates is displaced from the first set of texture coordinates along an axis of anisotropy. This second rendered copy of the object is then blended with the first rendered copy of the object to produce an object with anisotropic filtering.

In other embodiments of the invention, more than two copies of the object are rendered and blended together to form an object with anisotropic filtering.

BRIEF DESCRIPTION OF THE FIGURES

The present invention is described with reference to the accompanying figures. In the figures, like reference numbers indicate identical or functionally similar elements. Additionally, the leftmost digit or digits of a reference number identify the figure in which the reference number first appears. The accompanying figures, which are incorporated herein and form part of the specification, illustrate the present invention and, together with the description, further serve to explain the principles of the invention and to enable a person skilled in the relevant art to make and use the invention.

DETAILED DESCRIPTION OF THE PREFERRED EMBODIMENT

The present invention provides a method, system, and computer program product for anisotropic filtering, as well as applications thereof. A feature of the filtering process of the present invention is that it can be implemented using graphics hardware without any special texture filtering capabilities available in desk-top computer systems. Various features and advantages of the present invention, as well as the structure and operation of various embodiments of the present invention, are described in detail below with reference to the accompanying figures.

Terminology

As used herein, the term "image" or "scene" means an array of pixels. A typical image might have red, green, blue, and alpha pixel data, or other type of pixel data information as known to a person skilled in the relevant art.

The term "pixel" means a data structure, which is used to represent a picture element. Any type of pixel format can be used.

The term "texture image" means an array of texels or intensity values. A texture image can be any array of values that is used to determine a value for a pixel. As used herein, the term "texture image" includes texture maps, bump maps, environmental maps, et cetera.

The term "texel" means a texture element.

The term "texture sample" means a sample value selected from a texture map or texture image. The sample value can represent one texel value or can be formed from two or more texel values blended together to form a filtered texel. Different weighting factors can be used for each texel blended together to form a filtered texel. The terms "texel" and "texture sample" are sometimes used interchangeably.

The term "texture unit" refers to graphics hardware, firmware, and/or software that can be used to obtain a texture sample (e.g., a point sample, a bilinearly filtered texture sample, or a trilinearly filtered texture sample) from a texture image.

The term "real time" refers to a rate at which successive display images can be redrawn without undue delay upon a user or application. This interactive rate can include, but is not limited to, a rate equal to or less than approximately 120 frames/second. In one preferred example, an interactive rate is equal to or less than 60 frames/second. In some examples, real time can be one update per second.

Example Architecture of the Invention

Figure 1:
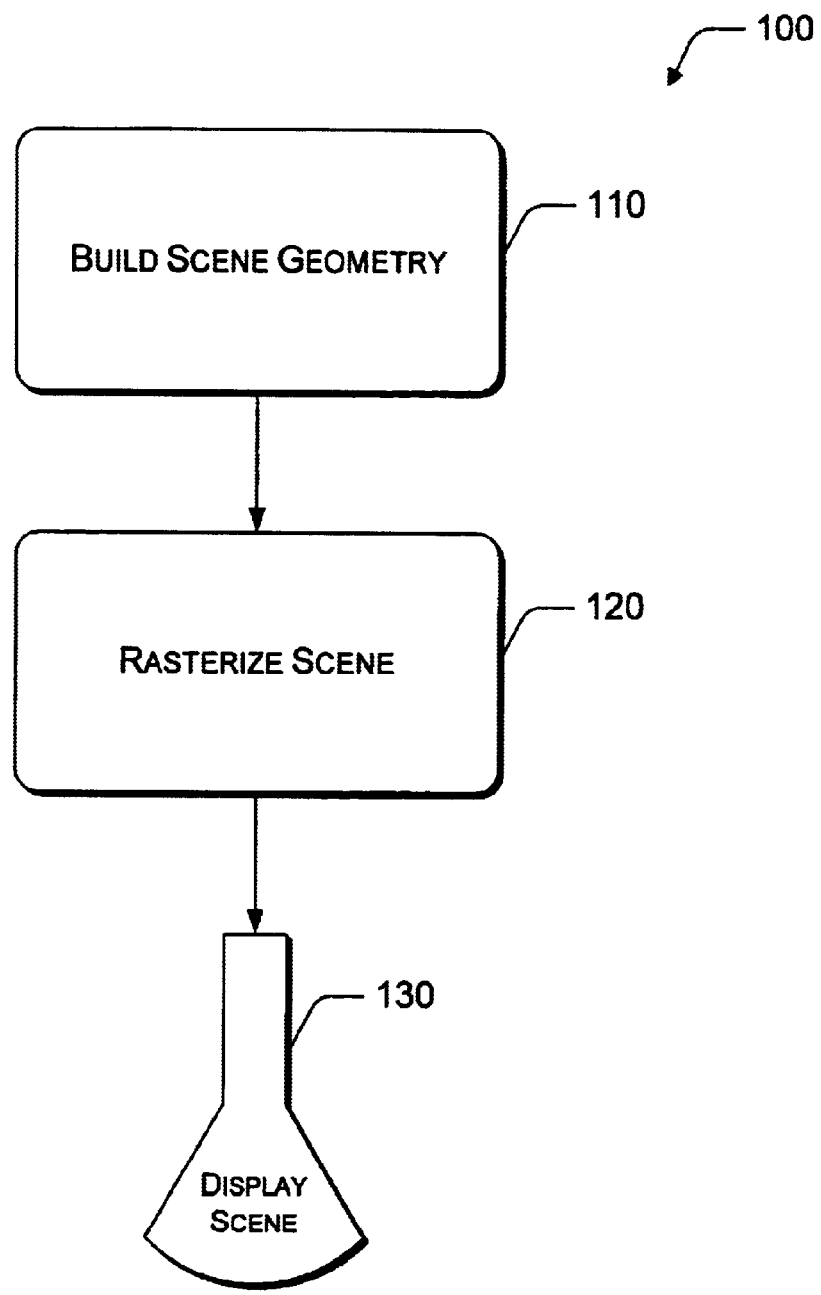
FIG. 1 illustrates a simplified example graphics pipeline according to an embodiment of the present invention.

It is a feature of the present invention that it may be implemented in many different ways, in many environments, and on many different computers or computer-like systems. FIG. 1 illustrates a simplified diagram of a graphics pipeline 100 in accordance with the present invention. Graphics pipeline 100 comprises three stages. In stage 110, a computer scene is built. In stage 120, the computer scene is rasterized. Finally, in stage 130, the computer scene is displayed. The architecture of each of these stages of graphics pipeline 100 is described in more detail below with reference to FIG. 2.

Figure 2:
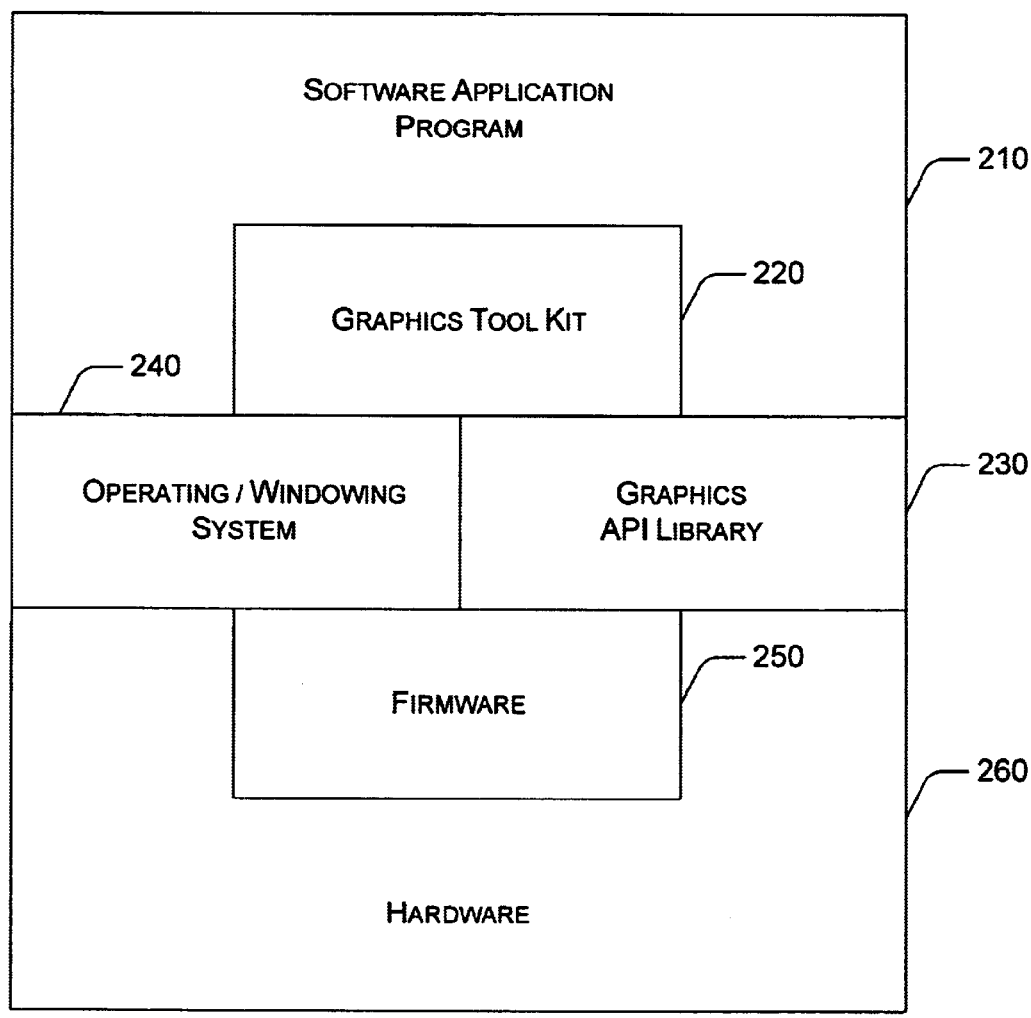
FIG. 2 illustrates a simplified example architecture according to an embodiment of the present invention.

FIG. 2 illustrates a block diagram of an example computer architecture 200 in which graphics pipeline 100 and various embodiments of the present invention can be implemented. Architecture 200 includes six overlapping layers. Layer 210 represents a high level software application program. Layer 220 represents a three-dimensional (3D) graphics software tool kit, such as OPENGL PERFORMER, available from Silicon Graphics, Inc., Mountain View, Calif. Layer 230 represents a graphics application programming interface (API), which can include but is not limited to OPENGL, available from Silicon Graphics, Inc. Layer 240 represents system support such as operating system and/or windowing system support. Layer 250 represents firmware. Finally, layer 260 represents hardware, including graphics hardware. Hardware 260 can be any hardware or graphics hardware including, but not limited to, a computer graphics processor (single chip or multiple chip), a specially designed computer, an interactive graphics machine, a gaming platform, a low end game system, a game console, a network architecture, et cetera. Some or all of the layers 210–260 of architecture 200 will be available in most commercially available computers.

As would be apparent to a person skilled in the relevant art given the description herein, the present invention can be implemented in any one of the layers 210–260 of architecture 200, or in any combination of layers 210–260 of architecture 200. For example, stage 110 of graphics pipeline 100 can be implemented in layers 210 and 220 of architecture 200 while stage 120 of graphics pipeline 100 can be implemented in layer 260. Stage 130 of graphics pipeline 100 is typically implemented in hardware, in layer 260 of architecture 200. In embodiments of the present invention, features of the invention are implemented in software that resides in layers 210, 220, 230 and/or 240 of architecture 200, and graphics hardware that resides in layers 250 and/or 260 of architecture 200 is used to rasterize and display an anisotropicly filtered computer scene. These various layers of architecture 200 are described below.

Example Method Embodiments of the Present Invention

Figure 3:
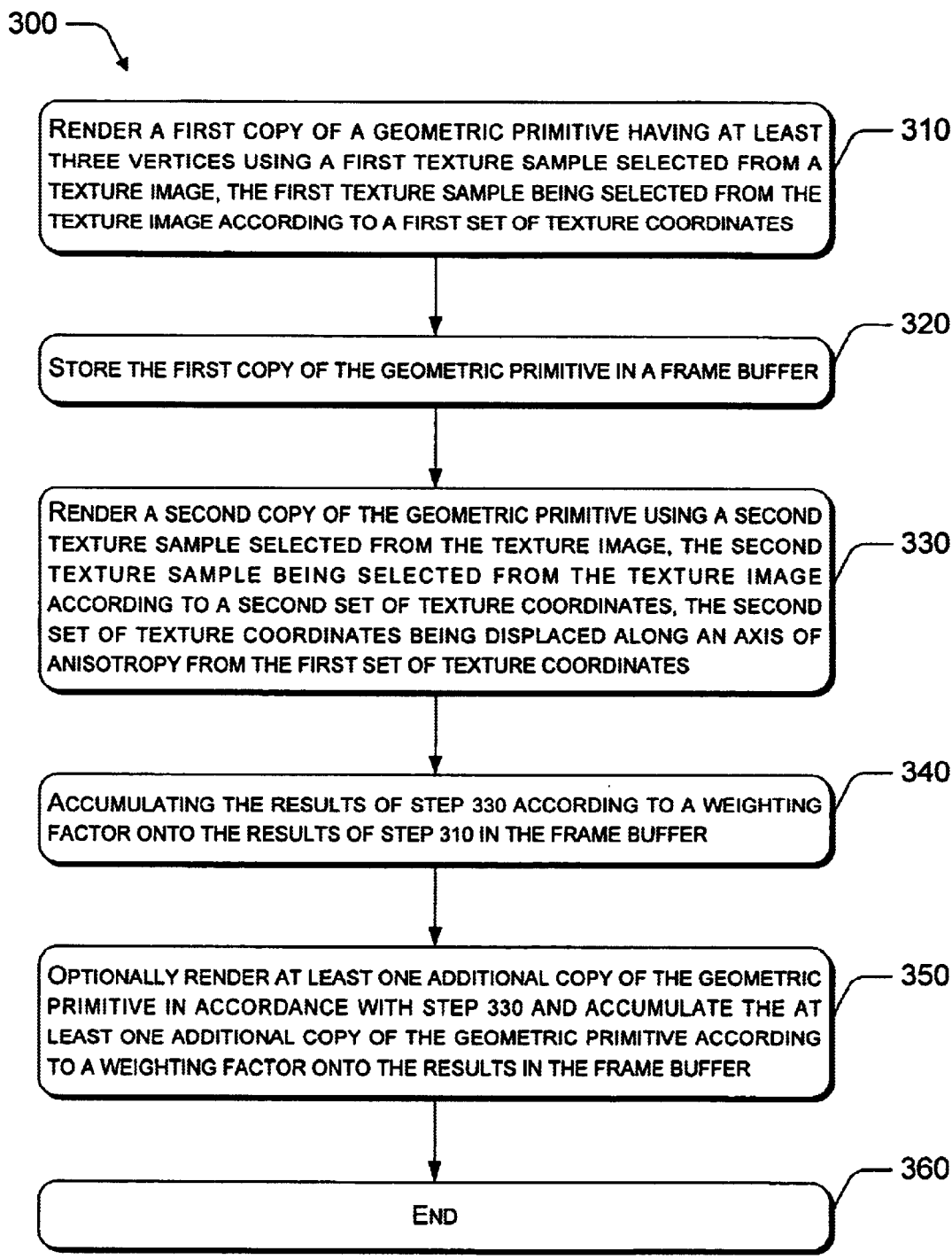
FIG. 3 illustrates an example method embodiment of the present invention.

FIG. 3 illustrates an example method 300 for filtering computer generated images and creating filtered scenes according to an embodiment of the present invention. Using method 300, it is possible to anisotropicly filter objects to produce higher quality computer graphics and/or graphics effects such as, for example, depth-of-field effects. Method 300 involves sampling higher frequency data texture maps than those currently sampled by commercially available graphics hardware using known methods. Method 300 also involves using multiple passes through a graphics pipeline to obtain multiple high frequency data texture samples. These multiple high frequency data texture samples are then combined in a buffer in a manner that will eliminate aliasing.

Method 300 takes advantage of the fact that graphics hardware can interpolate texels along the faces of polygons, such that the interpolation is linear across screen projections of vertices. Method 300 teaches one skilled in the relevant art how to distribute jitter along the vertices of an object to be rendered with anisotropic filtering according to the present invention, and use graphics hardware to perform the nonlinear filtering needed to smooth interpolation between the vertices of the object.

Method 300 can be implemented using software and hardware embodiments of the present invention as described herein. For example, the example software and hardware embodiments illustrated in FIGS. 9 and 10 can be used to implement method 300. As will be apparent to a person skilled in the relevant art given the discussion herein, method 300 can be used to anisotropicly filter any object or scene.

Figure 9:
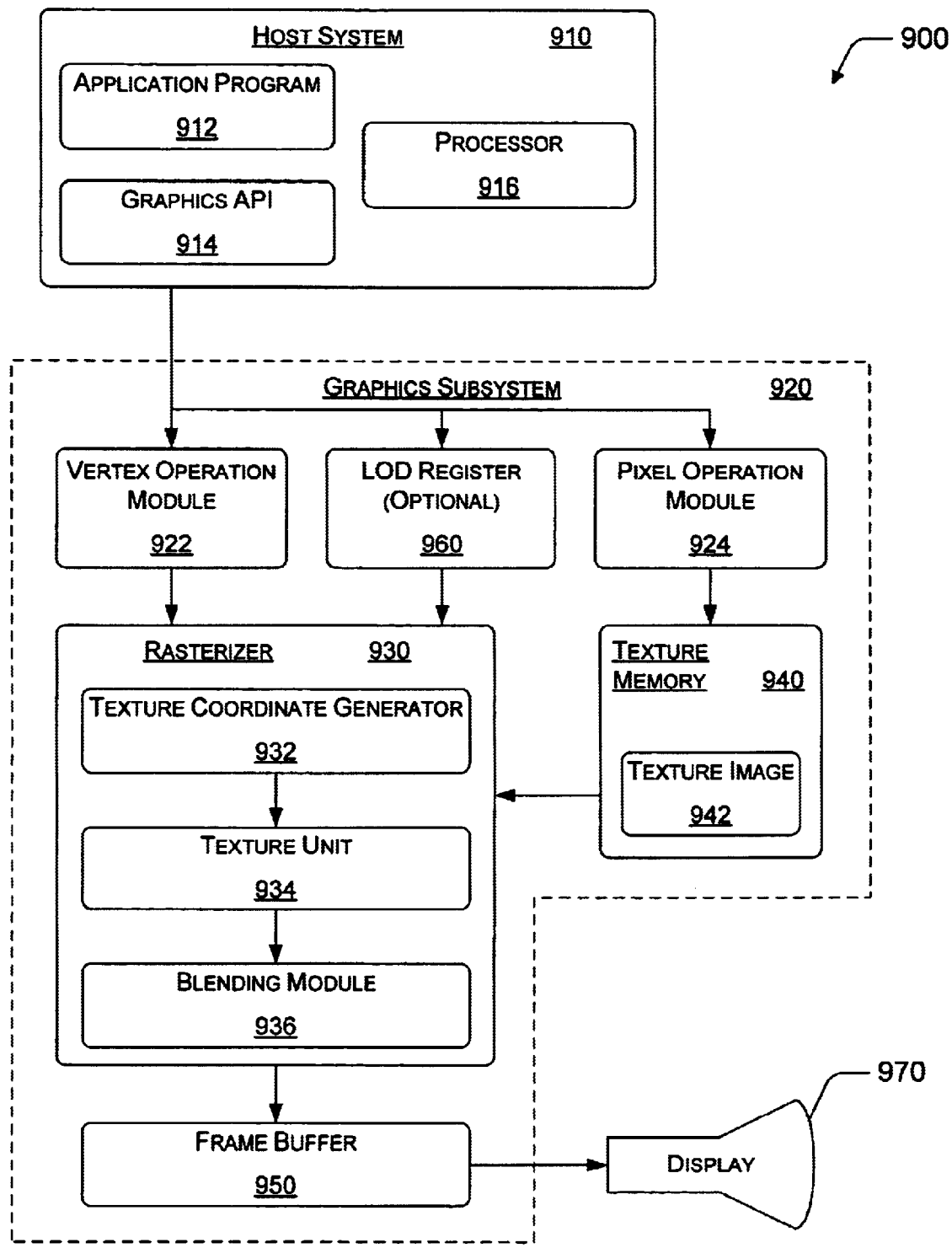
FIG. 9 illustrates an example system embodiment of the present invention.

In a preferred embodiment of the present invention, the hardware embodiment of FIG. 9 is used to implement method 300. As explained below, graphics subsystem 920 in FIG. 9 can be graphics hardware specially designed in accordance with the present invention. Alternatively, graphics subsystem 920 can be commercially available graphics hardware (e.g., a graphics display card capable of selecting a bilinearly or trilinearly filtered texture sample from a MIPMAP stored in a texture memory) that is configured by software, in accordance with the present invention, to anisotropicly filter an object during rendering. As would be familiar to a person skilled in the relevant art, available graphics hardware is typically accessed from an application program using a graphics API.

While preferred embodiments of the present invention can be implemented using commercially available graphics hardware and existing graphics APIs, some embodiments of the present invention could benefit from a new graphics API 914 in order to implement method 300, and an application program 912 written to take advantage of new graphics API 914, as described herein.

The description of method 300 that follows assumes that graphic subsystem 920 is a graphics display card capable of selecting a bilinearly or trilinearly filtered texture sample from a MIPMAP stored in a texture memory.

In step 310 of method 300, an object comprising at least one geometric primitive is rendered by rasterizer 930. The object (not shown) can comprise many geometric primitives or a single geometric primitive. For example, an object such as object 600 in FIG. 6A, which is modeled as a triangle strip, can be rendered with anisotropic filtering using method 300. As further described below, the triangle strip that forms object 600 is rendered as four triangles 610, 612, 614, and 616. Objects to be rendered in accordance with method 300 are typically stored in a memory, for example, main memory 1008 or secondary memory 1010 of a computer system 1000 (See FIG. 10).

In an embodiment of the present invention, an application program 912 running on a host system 910 having a processor 916 renders objects by using a graphics API 914 to draw a copy of an object stored in a memory to a frame buffer 950. In drawing the object to frame buffer 950, rasterizer 930 renders the object as a series of geometric primitives, such as for example triangles 610, 612, 614, and 616 of object 600.

During the rendering of a geometric primitive, texture unit 934 of graphics subsystem 920 obtains a texture sample (not shown) from texture image 942 stored in texture memory 940. Texture image 942 can be a MIPMAP. The texture sample obtained by texture unit 934 can be, for example, either a point sample, a bilinearly filtered texture sample, or a trilinearly filtered texture sample depending on the capabilities of texture unit 934. Typically, each vertex of the geometric primitive will have an associated (x, y) screen space coordinate and an associated (s, t) texture space coordinate that is used in selecting a texture sample from texture image 942, and in mapping the selected texture sample onto the geometric primitive. How available graphics hardware performs these steps would be known to a person skilled in the relevant art.

Figure 4A:
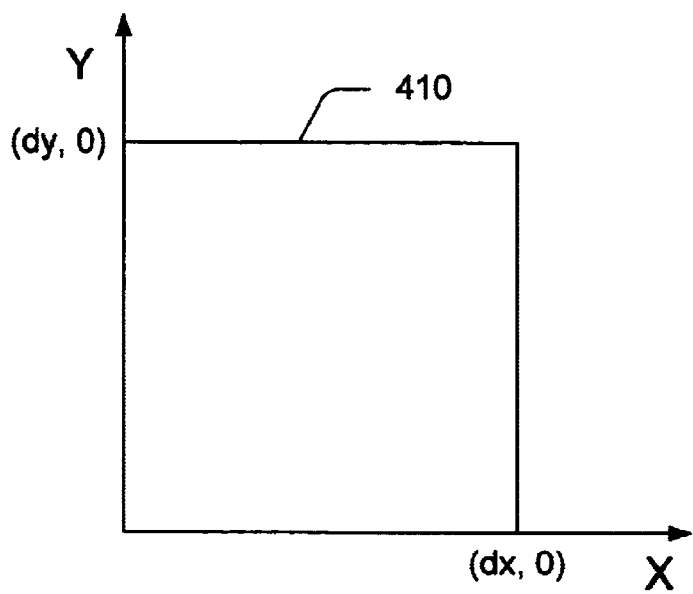
FIGS. 4A–B illustrate an example footprint of a pixel mapped in screen space and texture space.
Figure 4B:
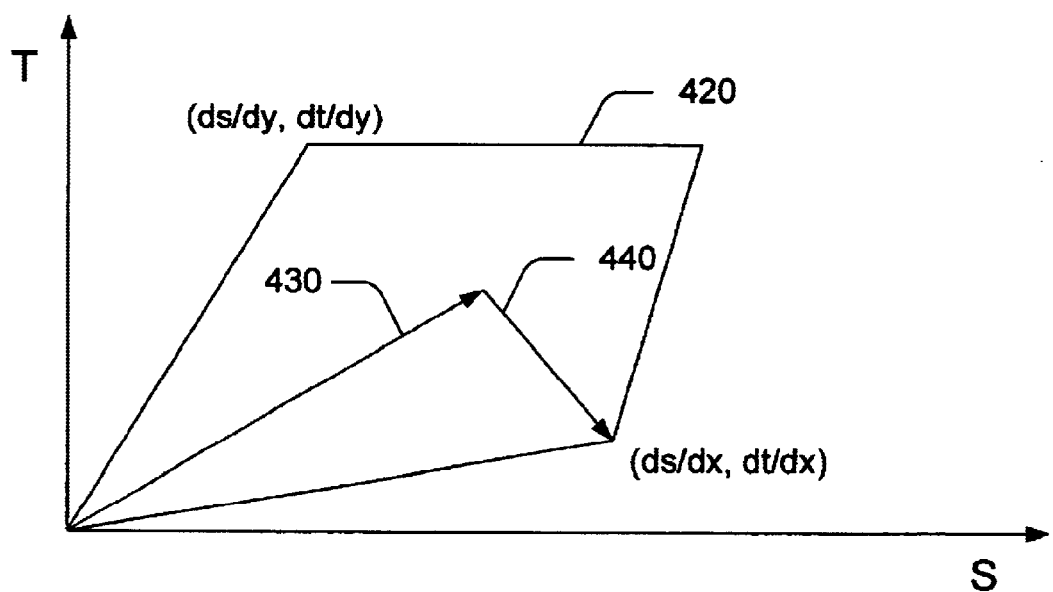

As would be known to a person skilled in the relevant art, the MIPMAP level or levels that are sampled by available graphics hardware in order to obtain a texture sample are based on the type of filtering being performed (e.g., bilinear filtering or trilinear filtering) and the coordinates for the vertices of the geometric primitive being rendered. For example, FIG. 4A illustrates an example object 410 in (x, y) screen space that is to be rendered using available graphics hardware. For ease of discussion, object 410 can be considered to occupy a single pixel in screen space. As illustrated in FIG. 4A, object 410 has normalized dimensions (dx, dy). FIG. 4B shows the footprint 420 in (s, t) texture space of object 410, as well as a major axis of anisotropy 430, and a minor axis of anisotropy 440. How footprint 420, major axis of anisotropy 430, and minor axis of anisotropy 440 are determined would be known to a person skilled in the relevant art.

Available graphics systems select a texture sample from a map level of a MIPMAP such that the map level (or levels), i.e., the level of detail (LOD), sampled corresponds to a particular frequency of data. One means used with available graphics cards to determine which LOD to sample is illustrated by EQ.1:

$$LOD = \log_2\left(\max\left(\frac{\partial s}{\partial x}, \frac{\partial t}{\partial x}, \frac{\partial s}{\partial y}, \frac{\partial t}{\partial y}\right)\right) \qquad \text{EQ. 1}$$

where $$\left(\frac{\partial s}{\partial x}, \frac{\partial t}{\partial x}, \frac{\partial s}{\partial y}, \frac{\partial t}{\partial y}\right)$$

are the partial derivatives of texture space coordinates s and t with respect to screen space coordinates x and y. If a map level having a higher frequency of data is sampled, aliasing occurs for reasons that would be known to a person skilled in the relevant art.

In step 310 of method 300, however, a lower LOD (i.e., higher frequency data map) is used. In an embodiment, the LOD that is sampled in step 310 to obtain a texture sample is determined by graphics API 914 according to EQ. 2:

$$LOD = \log_2\left(\max\left(\frac{\partial s}{\partial x}, \frac{\partial t}{\partial x}, \frac{\partial s}{\partial y}, \frac{\partial t}{\partial y}\right) - m\right) \qquad \text{EQ. 2}$$

where:

$$\left(\frac{\partial s}{\partial x}, \frac{\partial t}{\partial x}, \frac{\partial s}{\partial y}, \frac{\partial t}{\partial y}\right)$$

are the partial derivatives of coordinates s and t with respect to coordinates x and y; and m (or m:1) is the anisotropy.

The term m in EQ. 2 forces texture unit 934 to obtain a higher frequency data texture sample than would be obtained in accordance with EQ. 1, thereby ensuring that the texture sample obtained in step 310 has enough information to permit anisotropic filtering in accordance with the present invention. Another way of thinking about step 310 is that step 310 involves sampling an undersampled texel or map level of a MIPMAP. For example, if 2:1 anisotropic filtering is being performed, a map level X-1 is sampled by texture unit 934, where X is the LOD calculated according to EQ. 1. If 4:1 anisotropic filtering is desired, a map level X-2 is sampled, et cetera.

In step 320 of method 300, the geometric primitive rendered in step 310 is stored in frame buffer 950.

In step 330 of method 300, a second copy of the object rendered in step 310 is rendered using a second set of texture coordinates. The second set of texture coordinates is displaced along an axis of anisotropic from the set of texture coordinates used in step 310. As in step 310, EQ. 2 is used to determine which LOD of texture image 942 is used by texture unit 934 to obtain a texture sample.

In an embodiment of the present invention, application program 912 controls the calculation of the texture coordinates used in step 330 to obtain a texture sample from texture image 942. In an embodiment, application program 912 calculates texture coordinates for use in step 330 according to EQ. 3 and EQ. 4:

$$\text{newVertexS} = \text{oldVertexS} + \text{JitterS} \qquad \text{EQ. 3}$$

$$\text{newVertexT} = \text{oldVertexT} + \text{JitterT} \qquad \text{EQ. 4}$$

where:

newVertexS is the texture space coordinate (s);

oldVertexS is the texture space coordinate (s);

JitterS is a displacement in texture space coordinate (s);

newVertexT is the texture space coordinate (t);

oldVertexT is the texture space coordinate (t); and

JitterT is a displacement in texture space coordinate (t).

Figure 5:
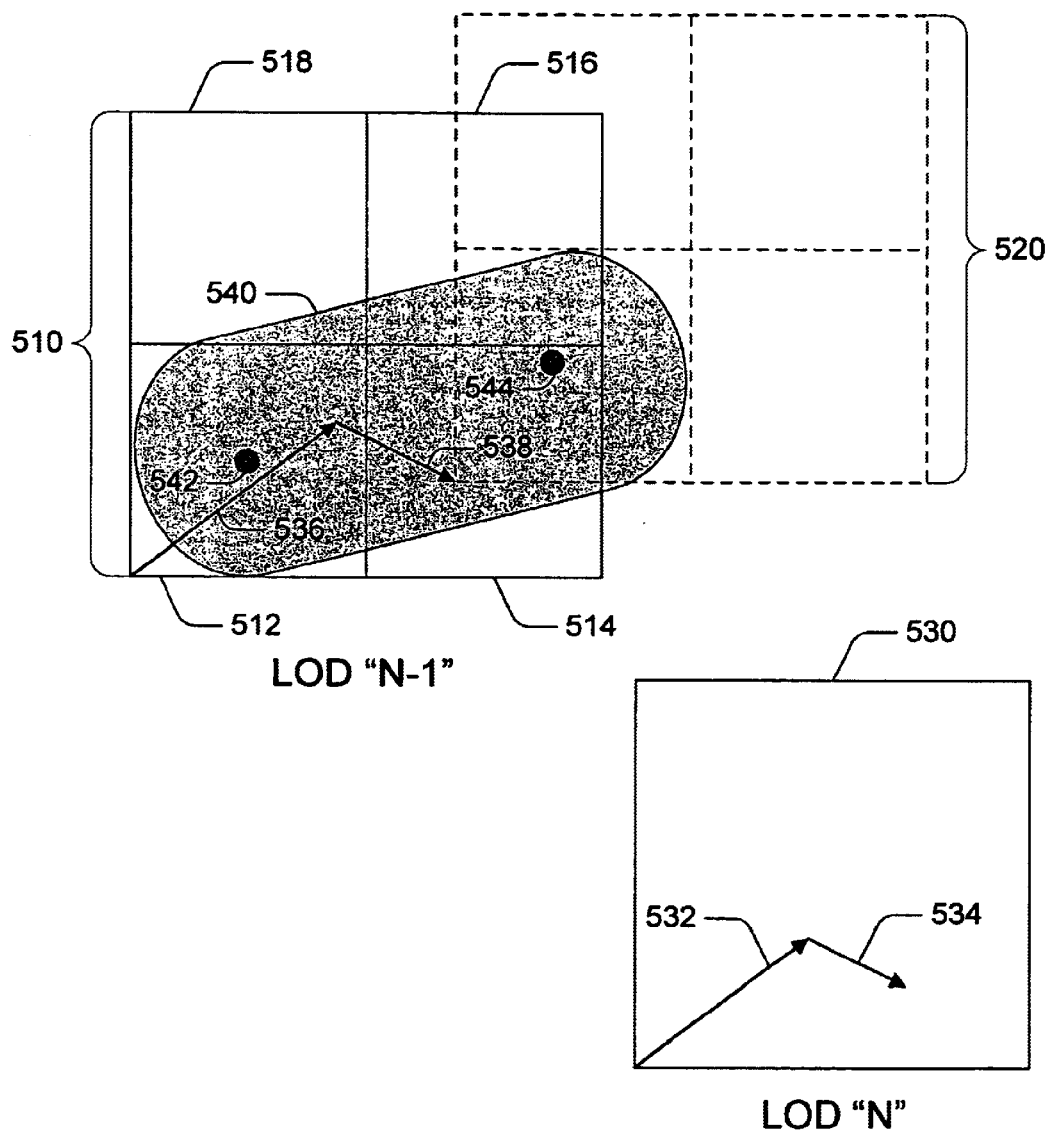
FIG. 5 illustrates two map levels of an example MIPMAP and implementation of an example embodiment of the present invention.

The relationship between a texture sample obtained in step 310 and a texture sample obtained in step 330 of method 300 is further illustrated in FIG. 5. FIG. 5 shows a texel 530 located at an LOD "N" and four texels 512, 514, 516, and 518 located at an LOD "N−1." LOD "N" and LOD "N−1" represent any two adjacent map levels of a MIPMAP 500. A major axis of anisotropy 532 and a minor axis of anisotropy 534, similar to major axis of anisotropy 430 and a minor axis of anisotropy 440 in FIG. 4B, are shown superimposed on texel 530 at LOD "N." An equivalent major axis of anisotropy 536 and a minor axis of anisotropy 538 are shown superimposed on texels 512 and 514 at LOD "N−1."

Looking at FIG. 5, point sample 542 in texel 512 represents a first texture sample obtained by texture unit 934 in step 310 of method 300. As indicated above, point sample 542 is stored in frame buffer 950 in step 320 of method 300.

In an embodiment, application program 912 calculates a JitterS and a JitterT factor according to EQ. 5 and EQ. 6, respectively.

$$\text{JitterS} = \frac{\max\left(\frac{\partial s}{\partial x}, \frac{\partial s}{\partial y}\right)}{2^m} \qquad \text{EQ. 5}$$

$$\text{JitterT} = \frac{\max\left(\frac{\partial t}{\partial x}, \frac{\partial t}{\partial y}\right)}{2^m} \qquad \text{EQ. 6}$$

where $\left(\frac{\partial s}{\partial x}, \frac{\partial s}{\partial y}\right)$ and $\left(\frac{\partial t}{\partial x}, \frac{\partial t}{\partial y}\right)$ are the partial derivatives of coordinates s and t with respect to coordinates x and y; and m (or m:1) is the anisotropy. Application program 912 then uses these factors to generate new texture coordinates for each vertex of the object (geometric primitive) rendered in step 310 according to EQs. 3 and 4, above. As would be apparent to a person skilled in the relevant art, EQs. 5 and 6 are approximations of an exact value for the axis of anisotropy, which can be used in accordance with the present invention for computational efficiency. When a high degree of anisotropic filtering according to the present invention is desired (e.g., when m equals 16), it may be necessary to calculate a more accurate value for the axis of anisotropy in accordance with known methods even though these methods are not as computationally efficient.

These new texture coordinates are used in step 330 to render a second copy of the object (geometric primitive). As illustrated in FIG. 5, sample point 544 is used to render a second copy of the object (geometric primitive) rendered in step 310. This second texture sample is offset from the first sample along the axis of anisotropy.

Another way of thinking about the differences between the copy of the object rendered in step 310 as compared to the copy of the object rendered in step 330, is to view the object being rendered in step 310 with a texture map 510 and the same object being rendered again in step 330 with a jittered copy of texture map 510, or texture map 520. In reality, it is the texture coordinates of the object being rendered that are jittered rather than the texture map.

In step 340, the object (geometric primitive) rendered in step 330 is accumulated according to a weighting factor on top of, or blended with, the object (geometric primitive) rendered in step 310 using blending module 936, and the result of this accumulating or blending operation is stored in frame buffer 950. In an embodiment, the objects rendered in steps 310 and 330 are blended together by blending module 936 according to the following blending equation:

$$GP_{Filtered} = GP_{First} \cdot \left(\frac{1}{m}\right) + GP_{Second} \cdot \left(\frac{1}{m}\right) + \ldots + GP_{m^{th}} \cdot \left(\frac{1}{m}\right) \qquad \text{EQ. 7}$$

where:

$GP_{Filtered}$ is a resultant filtered object or geometric primitive;

$GP_{First}$ is a first object or geometric primitive;

$GP_{Second}$ is a second object or geometric primitive;

$GP_{mth}$ is an $m^{th}$ object or geometric primitive; and (1/m) is a predetermined blending factor.

EQ. 7 is a general purpose equation that extends to "m" objects (e.g., 2, 4, 8, 16, et cetera). The blending factors (1/m) in EQ. 7 are variable and can be set by application program 912. For example, application program 912 might set the blending factors in EQ. 7 to (½).

After step 340, an anisotropicly filtered copy of the object (geometric primitive) resides in frame buffer 950, as would be apparent to a person skilled in the relevant art given the description herein. FIG. 5 illustrates how a desired anisotropicly filtered texture sample 540 can be obtained and applied to an object using method 300.

If additional anisotropic filtering is desired (e.g., 4:1 anisotropic filtering), in step 350 additional copies of the object can be rendered and accumulated in frame buffer 950, in a manner similar to that described above for steps 330 and 340. Each copy of the object rendered in step 330 has a unique set of texture coordinates calculated according to the method described above, as would be apparent to a person skilled in the relevant art given the description herein.

Method 300 ends at step 360, after the desired number of copies of the object have been rendered and accumulated in frame buffer 950.

As will be understood by a person skilled in the relevant art given the description herein, the various steps of method 300 can be implemented in one of several layers of architecture 200. For example, rather than having application program 912 calculate the JitterS and JitterT factors described above, these factors could be calculated using a graphics API based on one or more parameters passed to the API by application program 912. For example, application program 912 could pass a parameter indicating that an object to be anisotropicly filtered according to the present invention will be drawn to frame buffer 950 four times. Given this information, graphics API 914 would determine four sets of JitterS and JitterT factors to be used when rendering the four copies of the object. Graphics API 914 might also determine the blending or weighting factors to be used in accumulating the four copies of the object into frame buffer 950. Alternatively, some or all of these determinations could be determined using a graphics toolkit procedure, or the determinations could be made using firmware or hardware. Numerous means for implementing each of the steps of method 300 will be apparent to a person skilled in the relevant art given the description of the invention herein. These means are considered to be a part of the present invention.

It should be noted that any hardware that does Z-correct texture mapping (i.e., maps texels such that they are linearly mapped in screen space even under nonlinear perspective projection) needs the correct jittered sample location only at vertex locations. The hardware will correctly interpret all other pixel locations.

Figure 6A:
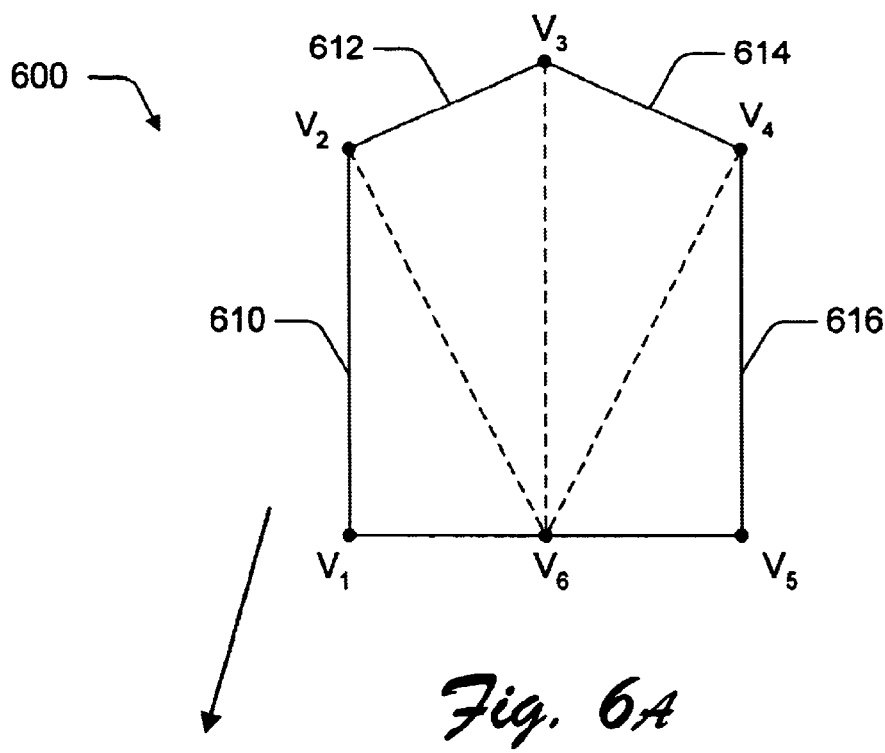
FIGS. 6A–B illustrates separating a triangle strip according to an embodiment of the present invention.
Figure 6B:
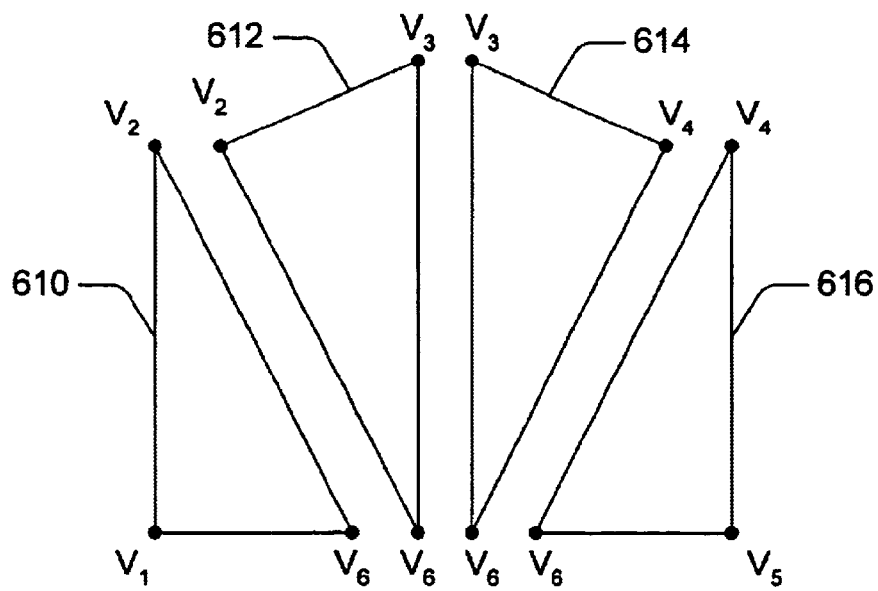

As mentioned above, in a preferred embodiment method 300 operates on triangles. FIGS. 6A–B illustrate separating an object described using a triangle strip into individual triangles. This separating operation can be performed by a programable geometry engine. A module for separating a triangle strip can reside, for example, in application program 912, in a graphics toolkit, or in graphics API 914. How to write such a module will be known to a person skilled in the relevant art given the description of the invention herein.

Example Applications of the Present Invention

Embodiments of the present invention, such as method 300, have a multitude of applications. To better understand this point, it is useful to view anisotropic filtering information as a geometry property associated with objects and an object's screen position rather than a pixel property associated with textures. When viewed in this manner, each object in a scene can have its own associated anisotropic filtering property, as described below. In addition, the degree of anisotropic filtering performed during the rendering of an object can be controlled according to the object's final screen position. Furthermore, it is even possible to negotiate between an object's particular filtering property and a filtering property based on final screen position when determining exactly how much filtering an object will receive during rendering. As described herein, embodiments of the present invention give a programmer a control over image quality and application performance heretofore unavailable.

Figure 7A:
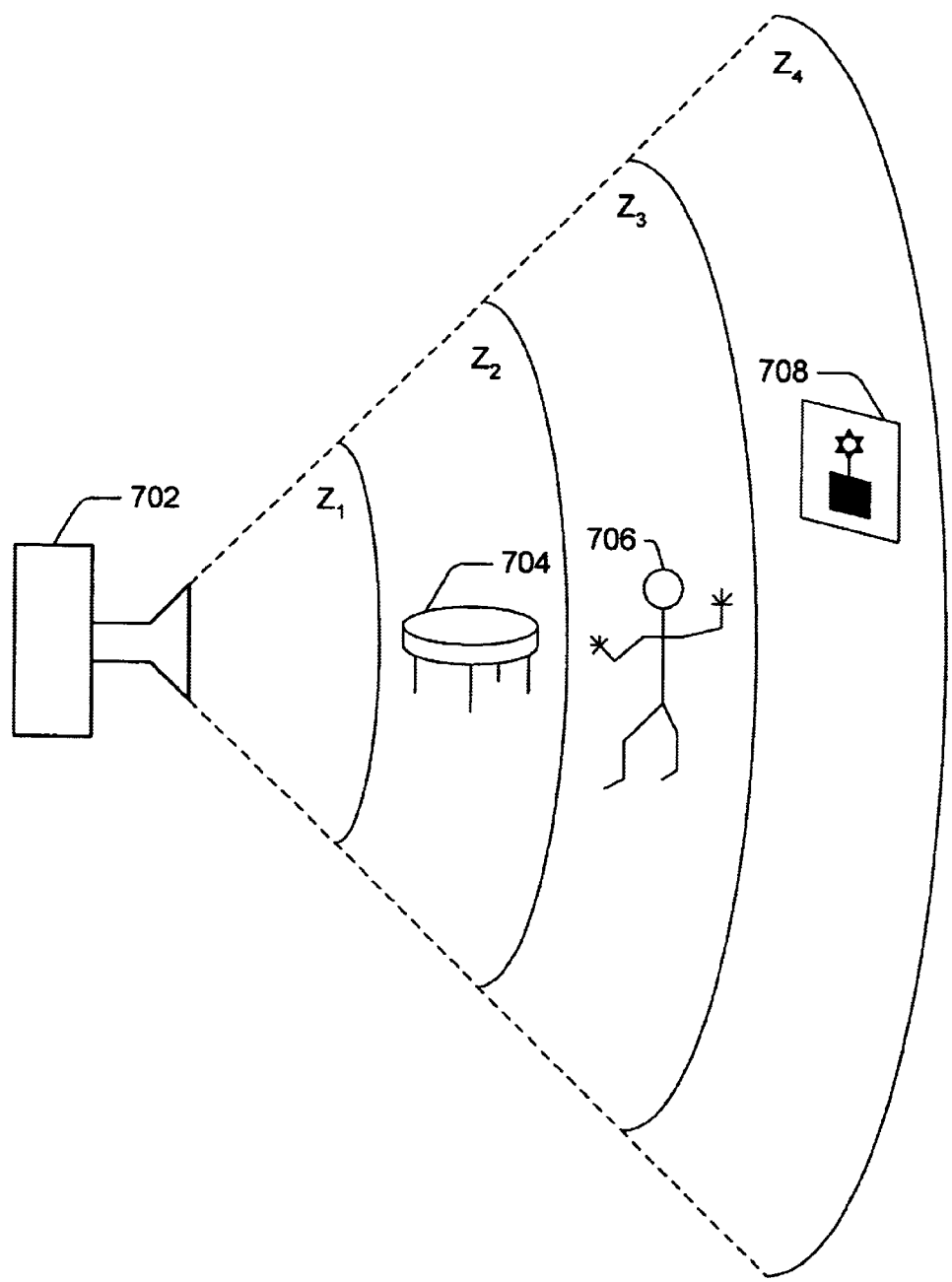
FIG. 7A illustrates an example application of the present invention.

FIG. 7A illustrates an example application of the present invention, in which a programmer can choose the degree of anisotropic filtering to be applied to an object based on the object's screen position. Since the degree of anisotropic filtering to be applied to an object according to the present invention is a property associated with an object's vertices, at the time of rendering, an object's screen space coordinates can be used to determine, for example, the number of copies of the object that will be combined together in a frame buffer to form an anisotropicly filtered object. The degree of anisotropic filtering of the object increases as additional copies of the object are rendered and accumulated according to method 300.

One possible way to render the scene illustrated in FIG. 7A according to the present invention is to assign a different anisotropic filtering property to each object based on the object's distance from the focal plane of camera 702. This is an application wherein the degree of anisotropic filtering is determined based on an object's final screen position. As would be known to a person skilled in the relevant art, an object's screen depth can be specified and ascertained using a z-buffer.

One rendering of the scene in FIG. 7A might have person 706 appear to be in the focal plane of camera 702. In this rendering, a programmer might choose to accumulate, for example, four copies of person 706 so that person 706 has a high image quality without any perceivable blurring. Since table 704 and picture 708 are rendered off of the focal plane, a programmer might choose to accumulate, for example, just two copies each of table 704 and picture 708. Thus, table 704 and picture 708 would have a lower image quality than person 706 thereby giving a viewer of the scene in FIG. 7A a sense of depth. As stated above, the z-buffer can be used to determine the degree of filtering applied to each object in FIG. 7A. As shown in FIG. 7A, table 704 is located at a depth of $Z_2$, person 706 is located at a depth of $Z_3$, and picture 708 is located at a depth of $Z_4$.

Another rendering of the scene in FIG. 7A might want to emphasize picture 708. As shown in FIG. 7A, picture 708 is oblique to camera 702 and thus will appear blurry when rendered using available graphics hardware according to known filtering methods. However, if picture 708 is rendered with anisotropic filtering according to the present invention (i.e., method 300), picture 708 can be rendered without any perceivable blurring. This is an example application of the present invention in which an anisotropic filtering technique of the present invention is used to improve the image quality available from existing graphics hardware.

The two example applications of the present invention described above can be combined when rendering the scene illustrated in FIG. 7A. For example, to give a viewer a sense of depth when viewing the scene illustrated in FIG. 7A, person 706 can be rendered with a high degree of anisotropic filtering according to the present invention, and table 704 and picture 708 can be rendered with a lower degree of anisotropic filtering according to the present invention. In order to improve the image quality of picture 708 and overcome the limitations of available graphics cards, picture 708 can be rendered with a higher degree of anisotropic filter according to the present invention than is necessary to achieve a sense of depth in the finished scene.

Figure 7B:
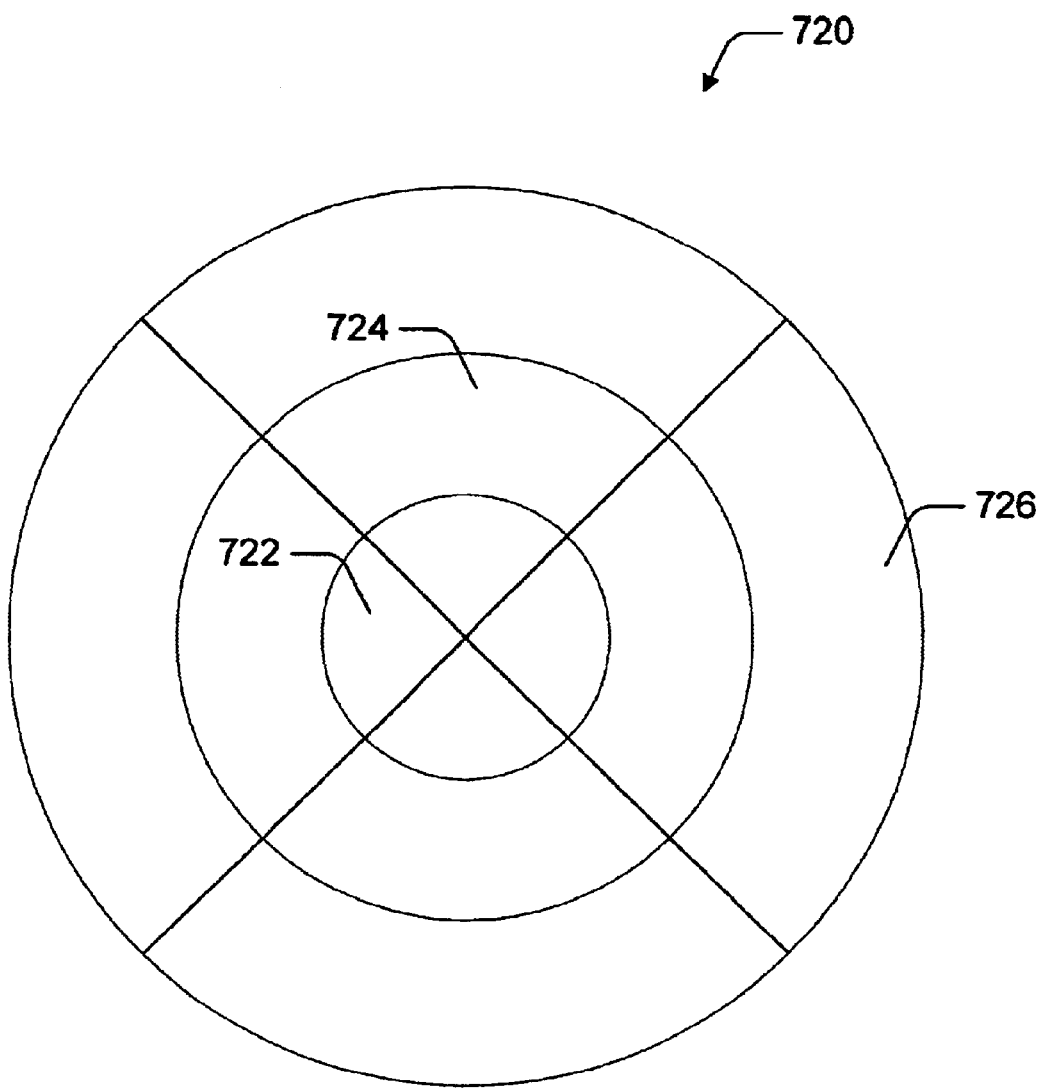
FIG. 7B illustrates how to generate depth-of-field effects according to an embodiment of the present invention.

FIG. 7B illustrates another example of how the anisotropic filtering techniques of the present invention can be used to create imaging effects such as, for example, camera depth-of-field effects. FIG. 7B illustrates a ball 720. Ball 720 comprises three annular zones that must be rendered with different degrees of image sharpness in order to give ball 720 a camera depth-of-field effect. As would be known to a person skilled in the relevant art, the texture on the geometric primitives in zone 722 must be rendered having a high degree of sharpness, the texture on the geometric primitives in zone 724 must be rendered having an intermediate degree of sharpness, and the texture on the geometric primitives in zone 726 must be rendered having the lowest degree of sharpness in order to create a camera depth-of-field effect.

This ball example application of the present invention described above is an example of assigning an anisotropic property to the vertices or geometric primitives that makeup an object. However, since an object is a combination of vertices or geometric primitives, the anisotropic property can be viewed as a property of the object too. The anisotropic property associated with each geometric primitive can be an absolute property, or it can be a relative property that describes the degree of filtering each geometric primitive receives during rendering in relation to the other geometric primitives that makeup an object. In this case, an absolute anisotropic value can be given to an object as a whole, and relative anisotropic values can be given to each geometric primitive that makes up the object. How this can be done will be known to a person skilled in the relevant art.

Figure 8:
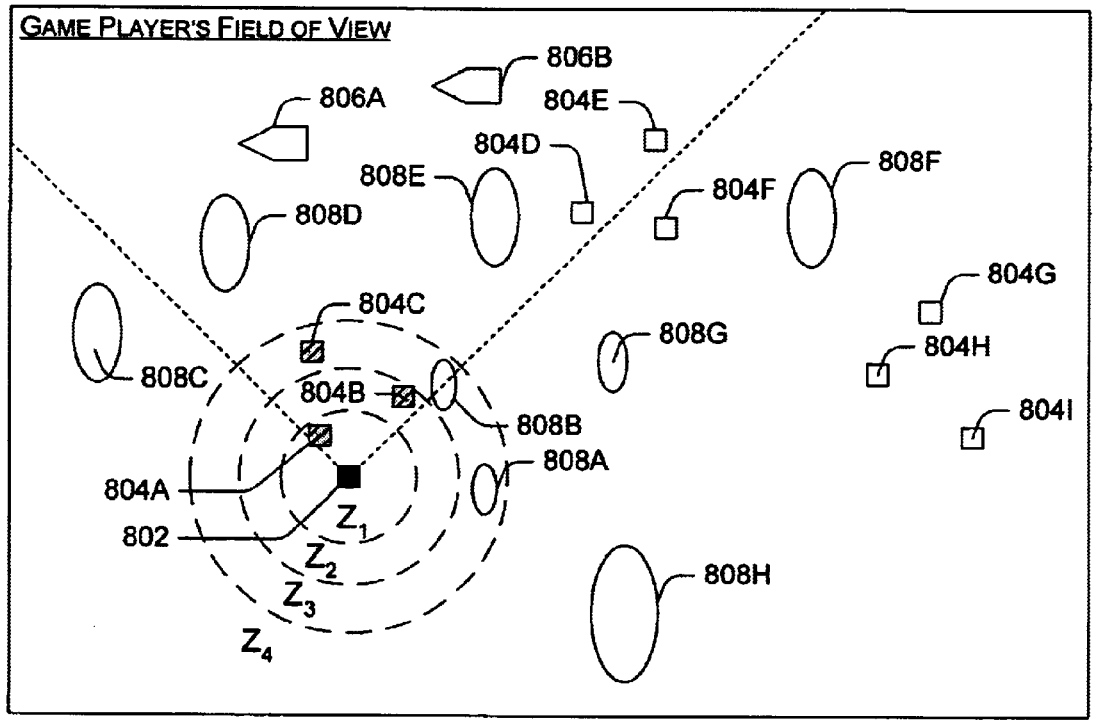
FIG. 8 illustrates another example application of the present invention.

FIG. 8 illustrates how the anisotropic filtering techniques of the present invention can be applied to a computer game, such as for example a combat aircraft game. Using the filtering techniques of the present invention, a game designer can control both the image quality of a game and the performance of the game. As would be known to a person skilled in the relevant art, computer games must run in real time to be successful, and they must deliver high quality images using commercially available graphics hardware.

FIG. 8 illustrates an aircraft 802 piloted by a game player. An object of the game is to sink enemy ships 806A and 806B without being shot-down by enemy aircraft 804D–I. Aircraft 804A, 804B, and 804C are friendly aircraft. Objects 808A–H represent clouds that can obscure a pilot's view. As illustrated in FIG. 8, the region and objects within the dotted lines represent the current cockpit view for the pilot of aircraft 802 (i.e., the scene being viewed by the game player). Typically, a game player can change the current cockpit view by toggling a button on a joystick (not shown) to view different scenes (e.g., to toggle between a front view, a right view, a left view, and a rear view).

The anisotropic filtering techniques of the present invention can be used with the computer game illustrated by FIG. 8 to significantly enhance a game player's enjoyment of the game. For example, the anisotropic filtering techniques of the present invention can be used to enhance image quality to a point that the pilot of aircraft 802 will be able to see and distinguish aircraft marking (e.g., on a wing) of another aircraft, regardless of the other aircraft's position relative to aircraft 802. The anisotropic filtering techniques of the present invention can also be used, for example, to enhance image quality to a point that the pilot of aircraft 802 will be able to see runway markings on a distant runway, which would not be visible using other filtering techniques.

As will be understood by a person skilled in the relevant art given the discussion herein, the present invention can be used by a computer game to optimize the performance of the game (program) while maintaining visual quality. For example, in an embodiment of the game above, when aircraft 802 is at about 80 nautical miles from a runway (e.g., the runway is located in zone $Z_4$), 8:1 anisotropic filtering might be required in order for the pilot of aircraft 802 to see the markings on the runway. Using the present invention, only the runway would have to be rendered with 8:1 anisotropic filtering as compared to the entire scene, which would be the case with known filtering techniques. This level of anisotropic filtering can be dynamically reduced to 4:1 anisotropic filtering according to the present invention when aircraft 802 is about 40 nautical miles from the runway (e.g., the runway is located in zone $Z_3$), thereby further improving game performance (e.g., the time needed to render the runway) while still maintaining image quality. When aircraft 802 is about 20 nautical miles from the runway (e.g., the runway is located in zone $Z_2$), the runway can be rendered with 2:1 anisotropic filtering according to the present invention, thereby even further increasing game performance while maintaining the visual quality of the game. Finally, when aircraft 802 is about 10 nautical miles from the runway (e.g., the runway is located in zone $Z_1$), the runway can be rendered with 1:1 anisotropic filtering according to the present invention. This dynamic filtering technique of the present invention can be used with any object.

As would be known to a person skilled in the relevant art, it is important to give the game player or pilot of aircraft 802 a sense of depth and motion. This can be achieved using the anisotropic filtering techniques of the present invention as described above. For example, to give the game player a sense of depth, objects close to the game player (e.g., aircraft 804A–C) can be rendered with a high degree of anisotropic filtering according to the present invention while objects far away from the game player (i.e., ships 806A–B) can be rendered using a lower degree of anisotropic filtering according to the present invention. Enemy aircraft 804D and 804E could be rendered with an intermediate degree of anisotropic filtering. To give the game player a sense of motion (i.e., a sense of flying), the anisotropic filtering techniques of the present invention can be used to create motion blur effects in a manner that would be apparent to a person skilled in the relevant art given the discussion the invention herein.

Aircraft 802 is shown having four different fields of depth extending outwards from aircraft 802. These four fields of depth illustrate the fact that the amount of anisotropic filtering according to the present invention used in rendering an object can be a property of an object's screen position. Thus, in one rendering of the cockpit view for aircraft 802, aircraft 804A might be rendered with more anisotropic filtering than aircraft 804C. The degrees of anisotropic filter used to render each aircraft can be a function of each aircraft's z-coordinate. Furthermore, each aircraft could have an absolute anisotropic property (stored, for example, as a program controlled variable) and relative anisotropic properties associated with each geometric primitive that makes up the aircraft. In this case, an application program could specify or update, for example, each aircraft's absolute anisotropic property value dynamically as the distance between an aircraft and aircraft 802 changes during game play. The relative amount of anisotropic filtering used in rendering each part of an aircraft could be fixed in relationship to the aircraft's absolute anisotropic property value by the geometric model of an aircraft object.

As described above, it may also be desirable in a computer game scene to select particular objects in the scene for a certain level of anisotropic filtering depending on the importance of the objects in a scene. In FIG. 8, ships 806A and 806B, as well as enemy aircraft 804D and 804E, are of particular importance to the game player who is flying aircraft 802. Since these particular objects are far from aircraft 802, they may be rendered with a low level of filtering and thus be blurry. To enhance image quality for the game player, these objects can be rendered with a higher level of anisotropic filtering than would be otherwise warranted because of their position relative to aircraft 802. In contrast, clouds 808 are not particularly important to a game player, and thus these objects would not be rendered using enhanced anisotropic filtering, thereby allowing a scene to be rendered more quickly than if each cloud were rendered with enhanced filtering according to the present invention.

This enhanced rendering feature of the game can be implemented by having a module in an application program that negotiates between an object-based anisotropic property and a screen position-based anisotropic property according to the present invention. For example, each ship and aircraft object in the game can be assigned an enhanced anisotropic value that is permanently associated with an object. For discussion purposes, this value might be equal to four, which indicates that at least four copies of each ship or aircraft object will be rendered and accumulated according to method 300 as described above. In contrast, each cloud can have a low anisotropic property so that each cloud object is only rendered once unless required to be rendered more than once because of its screen position.

To illustrate this feature further, assume that the game program operates according to the following rules:

(1) every cloud object is rendered and accumulated at least once according to the method 300;

(2) each ship and aircraft object is rendered and accumulated at least four times according to the method 300;

(3) each object in zone $Z_4$ in FIG. 8 is rendered and accumulated at least once according to the method 300; and (4) each object in zone $Z_3$ in FIG. 8 is rendered and accumulated at least twice according to the method 300.

According to these rules, it will be apparent to a person skiled in the relevant art that ships 806A and 806B, as well as aircraft 804D and 804E, will be rendered and accumulated four times according to the method 300. This is because, for example, the anisotropic property of ship 806A (i.e., an anisotropic value of four) takes precedence over the screen-based anisotropic value in zone $Z_4$, which is one. Similarly, cloud 808B will be rendered and accumulated twice according to the method 300 because the screen-based anisotropic value in zone $Z_3$ is two, which is higher than the anisotropic property of cloud 808B (i.e., an anisotropic value of one). As will be apparent to a person skilled in the relevant art, assigning anisotropic properties to objects and screen locations, and allowing for a program or game to negotiate between the two properties, gives a game programer a great deal of control over image quality and game performance characteristics.

Based on the above example applications, a person skill in the relevant art will understand that the anisotropic filtering techniques taught and described herein can be used in many situations. Thus, the examples described herein are not intended to limit the present invention but rather to teach one skilled in the relevant art how to use the present invention. In machines where the LOD cannot be controlled, the present invention (e.g., method 300) can be used for view-dependent antialiasing.

Example System Embodiments of the Present Invention

FIG. 9 illustrates an example graphics system 900 according to an embodiment of the present invention. Graphics system 900 comprises a host system 910, a graphics subsystem 920, and a display 970. Each of these features of graphics system 900 is further described below.

Host system 910 comprises an application program 912, a processor 916, and a hardware interface or graphics API 914. Application program 912 can be any program requiring the rendering of a computer image or scene. The computer code of application program 912 is executed by processor 916. Application program 912 assesses the features of graphics subsystem 920 and display 970 through hardware interface or graphics API 914.

Graphics subsystem 920 comprises a vertex operation module 922, a pixel operation module 924, a rasterizer 930, a texture memory 940, and a frame buffer 950. Texture memory 940 can store one or more texture images 942. Texture memory 940 is connected to a texture unit 934 by a bus. Rasterizer 930 comprises a texture coordinate generator 932, texture unit 934, and a blending module 936. The operation of these features of graphics system 900 would be known to a person skilled in the relevant art.

In some embodiments of the present invention, texture unit 934 can obtain either a point sample, a bilinearly filtered texture sample, or a trilinearly filtered texture sample from texture image 942. The present invention will also work for texture units yet to be developed that maybe capable of obtaining an anisotropicly filtered texture sample from texture image 942. As described herein, the present invention can be used to increase the filtering quality of any such graphics hardware. Blending module 936 blends texels and/or pixel values to produce a single texel or pixel. The output of texture unit 838 and/or blending module 936 is stored in frame buffer 950. Display 970 can be used to display images or scenes stored in frame buffer 950.

An optional feature illustrated in FIG. 9 is LOD register 960. As described herein, different objects can be rendered with different degrees of anisotropic filtering. For example, as described for the game application above, at least four copies of an aircraft would be rendered and accumulated in frame buffer 950 according to the present invention. Thus, optional LOD register 960 is a feature that can be used to store an anisotropic property value and thereby control, for example, how many times an object is drawn to frame buffer 950 according to the present invention. LOD register 960 can be used, for example, to make the programing of an application program that uses the present invention easier to develop. Other functions according to the present invention that could be controlled using LOD register 960 will be apparent to a person skilled in the relevant art given the description of the invention herein.

Figure 10:
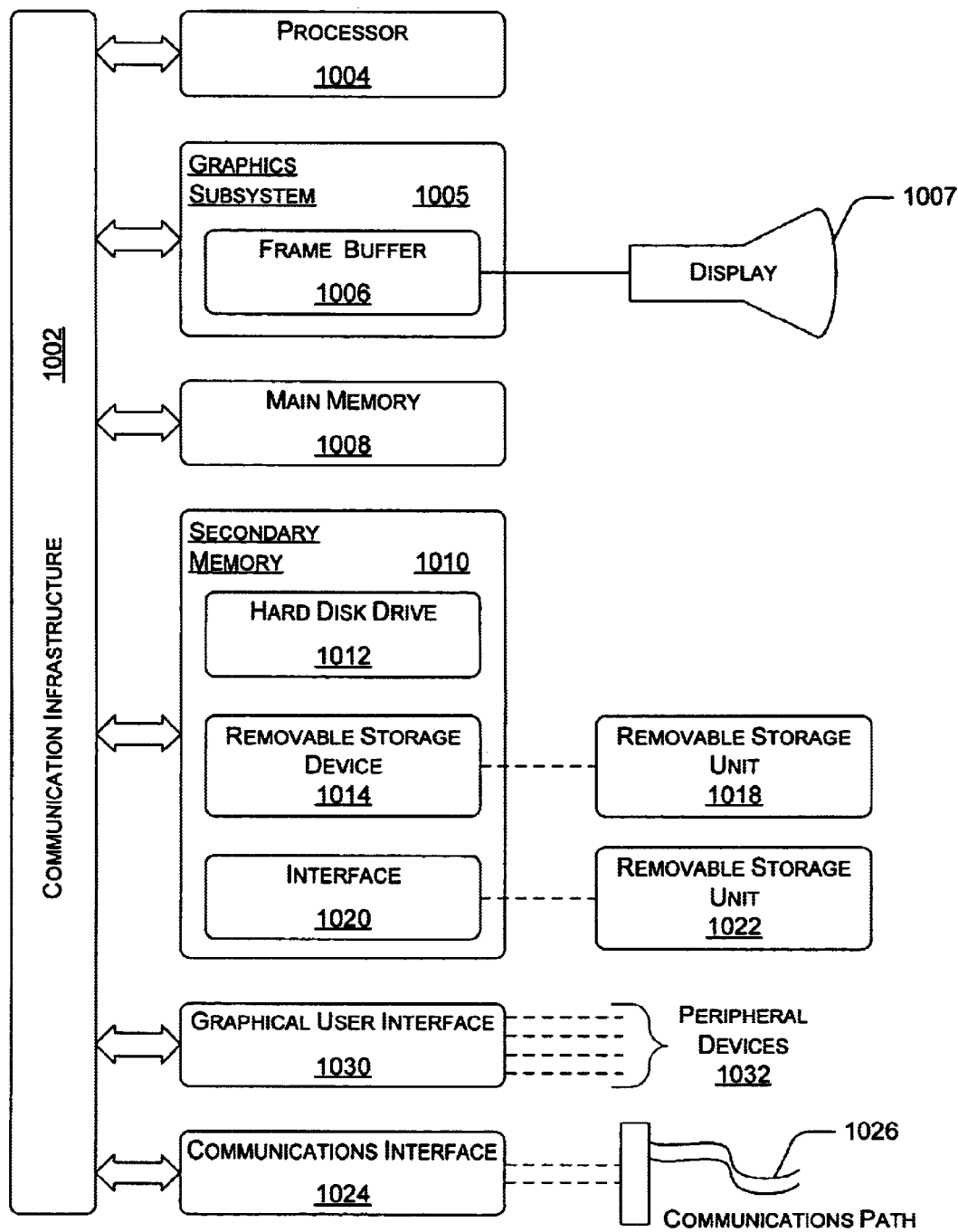
FIG. 10 illustrates an example computer system that can be used to practice various embodiments of the present invention.

Example Computer System for Implementing Computer Program Product Embodiments of the Invention Referring to FIG. 10, an example of a computer system 1000 is shown, which can be used to implement computer program product embodiments of the present invention. This example computer system is illustrative and not intended to limit the present invention. Computer system 1000 represents any single or multi-processor computer. Single-threaded and multi-threaded computers can be used. Unified or distributed memory systems can be used.

Computer system 1000 includes one or more processors, such as processor 1004, and one or more graphics subsystems, such as graphics subsystem 1005. One or more processors 1004 and one or more graphics subsystems 1005 can execute software and implement all or part of the features of the present invention described herein. Graphics subsystem 1005 can be implemented, for example, on a single chip as a part of processor 1004, or it can be implemented on one or more separate chips located on a graphic board. Each processor 1004 is connected to a communication infrastructure 1002 (e.g., a communications bus, cross-bar, or network). After reading this description, it will become apparent to a person skilled in the relevant art how to implement the invention using other computer systems and/or computer architectures.

Computer system 1000 also includes a main memory 1008, preferably random access memory (RAM), and can also include secondary memory 1010. Secondary memory 1010 can include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well known manner. Removable storage unit 1018 represents a floppy disk, magnetic tape, optical disk, etc., which is read by and written to by removable storage drive 1014. As will be appreciated, the removable storage unit 1018 includes a computer usable storage medium having stored therein computer software and/or data.

In alternative embodiments, secondary memory 1010 may include other similar means for allowing computer programs or other instructions to be loaded into computer system 1000. Such means can include, for example, a removable storage unit 1022 and an interface 1020. Examples can include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

In an embodiment, computer system 1000 includes a frame buffer 1006 and a display 1007. Frame buffer 1006 is in electrical communication with graphics subsystem 1005. Images stored in frame buffer 1006 can be viewed using display 1007.

Computer system 1000 can also include a communications interface 1024. Communications interface 1024 allows software and data to be transferred between computer system 1000 and external devices via communications path 1026. Examples of communications interface 1024 can include a modem, a network interface (such as Ethernet card), a communications port, etc. Software and data transferred via communications interface 1024 are in the form of signals which can be electronic, electromagnetic, optical or other signals capable of being received by communications interface 1024, via communications path 1026. Note that communications interface 1024 provides a means by which computer system 1000 can interface to a network such as the Internet.

Computer system 1000 can include one or more peripheral devices 1032, which are coupled to communications infrastructure 1002 by graphical user-interface 1030. Example peripheral devices 1032, which can from a part of computer system 1000, include, for example, a keyboard, a pointing device (e.g., a mouse), a joy stick, and a game pad. Other peripheral devices 1032, which can form a part of computer system 1000 will be known to a person skilled in the relevant art given the description herein.

The present invention can be implemented using software running (that is, executing) in an environment similar to that described above with respect to FIG. 10. In this document, the term "computer program product" is used to generally refer to removable storage unit 1018, a hard disk installed in hard disk drive 1012, or a carrier wave or other signal carrying software over a communication path 1026 (wireless link or cable) to communication interface 1024. A computer useable medium can include magnetic media, optical media, or other recordable media, or media that transmits a carrier wave. These computer program products are means for providing software to computer system 1000.

Computer programs (also called computer control logic) are stored in main memory 1008 and/or secondary memory 1010. Computer programs can also be received via communications interface 1024. Such computer programs, when executed, enable the computer system 1000 to perform the features of the present invention as discussed herein. In particular, the computer programs, when executed, enable the processor 1004 to perform the features of the present invention. Accordingly, such computer programs represent controllers of the computer system 1000.

In an embodiment where the invention is implemented using software, the software may be stored in a computer program product and loaded into computer system 1000 using removable storage drive 1014, hard drive 1012, or communications interface 1024. Alternatively, the computer program product may be downloaded to computer system 1000 over communications path 1026. The control logic (software), when executed by the one or more processors 1004, causes the processor(s) 1004 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to a person skilled in the relevant art.

Conclusion

Various embodiments of the present invention have been described above, which are independent of image complexity and are capable of being implemented on an interactive graphics machine. It should be understood that these embodiments have been presented by way of example only, and not limitation. It will be understood by those skilled in the relevant art that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A method for filtering a computer generated image, comprising the steps of:
   (1) rendering a first copy of a geometric primitive having at least three vertices using a first texture sample selected from a texture image, the first texture sample being selected from the texture image according to a first set of texture coordinates for each vertex of the geometric primitive;
   (2) rendering a second copy of the geometric primitive using a second texture sample selected from the texture image, the second texture sample being selected from the texture image according to a second set of texture coordinates for each vertex of the geometric primitive, the second set of texture coordinates for each vertex of the geometric primitive being displaced along an axis of anisotropy from the first set of texture coordinates for each vertex for the geometric primitive; and
   (3) accumulating the results of step (2) according to a weighting factor onto the results of step (1).

2. The method of claim 1, wherein each of steps (1) and (2) comprise the step of sampling an undersampled texel of the texture image.

3. The method of claim 2, wherein each of steps (1) and (2) comprise the step of sampling an undersampled map level of a MIPMAP.

4. The method of claim 3, wherein each of steps (1) and (2) comprise the step of selecting a bilinearly filtered texture sample from the MIPMAP.

5. The method of claim 3, wherein each of steps (1) and (2) comprise the step of selecting a trilinearly filtered texture sample from the MIPMAP.

6. The method of claim 1, wherein step (2) comprises the step of selecting a second texture sample using a set of texture coordinates for each vertex of the geometric primitive generated in accordance with a Jitter-S factor and a Jitter-T factor.

7. The method of claim 1, wherein step (3) comprises the step of accumulating the results of step (2) onto the results of step (1) in a frame buffer.

8. The method of claim 1, further comprising the steps of:
   (4) rendering an additional copy of the geometric primitive using an additional texture sample selected from the texture image, the additional texture sample being selected from the texture image according to an additional set of texture coordinates for each vertex of the geometric primitive; and (5) accumulating the results of step (4) according to a weighting factor onto the results from step (3).

9. The method of claim 8, further comprising the steps of repeating step (4) and step (5) for additional sets of texture coordinates for each vertex.

10. A computer program product comprising a computer useable medium having computer program logic recorded thereon for enabling a processor to generate a computer scene, said computer program logic comprising:

a rendering procedure that enables the processor to render copies of an object having a plurality of vertices, at least some of the plurality of vertices having an associated set of texture coordinates used to select at least one texture sample from a texture image;

a texture coordinate procedure that enables the processor to calculate sets of texture coordinates for at least some of the vertices of the object, the calculated sets of texture coordinates being calculated in accordance with at least one factor relating to anisotropy; and a blending procedure that enables the processor to blend according to a weighting factor a first copy of the object rendered in accordance with a first set of texture coordinates with a second copy of the object rendered in accordance with a second set of texture coordinates to produce a third copy of the object, the third copy of the object having a greater degree of filtering than the first copy and the second copy of the object.

11. The computer program product of claim 10, wherein the rendering procedure enables the processor to use at least one undersampled texel from the texture image in rendering a copy of the object.

12. The computer program product of claim 10, wherein the rendering procedure enables the processor to render a copy of the object in accordance with an anisotropy factor associated wit the object.

13. The computer program product of claim 10, wherein the rendering procedure enables the processor to render a copy of the object in accordance with an anisotropy factor associated with a depth of the object.

14. The computer program product of claim 10, wherein the rendering procedure enables the processor to convert a triangle strip into a plurality of individual triangular geometric primitives.

15. The computer program product of claim 10, wherein the texture coordinate procedure enables the processor to calculate a second set of texture coordinates for a vertex of the object based on a first set of texture coordinates for the vertex and a Jitter factor relating to anisotropy.

16. The computer program product of claim 10, wherein the blending procedure enables the processor to blend a first and a second copy of the object according to a weighting factor of fifty-percent.

17. A system for generating a computer scene, comprising:

a frame buffer for storing data used to display the computer scene;

a vertex operation module for operating on data used to render multiple copies of a geometric primitives that is associated with the computer scene;

a texture memory for storing texture image data used to render the multiple copies of the geometric primitives that is associated with the computer scene;

a rasterizer coupled to the frame buffer, the vertex operation module, and the texture memory, the rasterizer for rendering the multiple copies of the geometric primitives that is associated with the computer scene according to data received from the vertex operation module and the texture memory and for blending a rendered second copy of the geometric primitive according to a weighting factor with a rendered first copy of the geometric primitive that is stored in the frame buffer; and a level-of-detail register for storing level-of-detail data used to determine a first data set stored in the texture memory to be sampled by the rasterizer during the rendering of the first copy of the geometric primitives that is associated with the computer scene, the first data set based on a first set of coordinates, and to determine a second data set stored in the texture memory to be sampled by the rasterizer during the rendering of the second copy of the geometric primitive, the second data set based on a second set of coordinates, the second set of coordinates being displaced along an axis of anisotropy from the first set of coordinates.

18. The system of claim 17, wherein a bit of the level-of-detail register can be set by an application program running on a host system.

19. The system of claim 17, wherein the level of detail register is accessible to an application program running on a host system using a graphics application programming interface.

20. The system of claim 17, wherein the level-of-detail register comprises at least one bit of a multi-bit register on a graphics card.

\* \* \* \* \*

UNITED STATES PATENT AND TRADEMARK OFFICE
CERTIFICATE OF CORRECTION

PATENT NO. : 6,664,971 B1
DATED : December 16, 2003
INVENTOR(S) : Mukherjee et al.

It is certified that error appears in the above-identified patent and that said Letters Patent is hereby corrected as shown below:

Column 14,
Line 5, replace "maybe" with -- may be --.
Line 23, replace "programing" with -- programming --.

Signed and Sealed this

Sixth Day of July, 2004

JON W. DUDAS
*Acting Director of the United States Patent and Trademark Office*